United States Patent [19]

Tanimoto et al.

[11] 4,116,144
[45] Sep. 26, 1978

[54] STITCH PATTERN FORMING CONTROL IN A SEWING MACHINE

[75] Inventors: Akira Tanimoto, Kashihara; Yukihiro Yoshida, Ikoma; Sunao Katoh, Yamatokoriyama, all of Japan

[73] Assignee: Sharp Kabushiki Kaisha, Osaka, Japan

[21] Appl. No.: 766,349

[22] Filed: Feb. 7, 1977

[30] Foreign Application Priority Data

| Feb. 6, 1976 | [JP] | Japan | 51-13483 |
| Feb. 6, 1976 | [JP] | Japan | 51-13484 |
| Feb. 9, 1976 | [JP] | Japan | 51-13667 |
| May 11, 1976 | [JP] | Japan | 51-54009 |
| Aug. 30, 1976 | [JP] | Japan | 51-103913 |

[51] Int. Cl.² ............................................. D05B 3/02
[52] U.S. Cl. ................................................ 112/158 E
[58] Field of Search .......... 112/158 E, 121.12, 121.11; 235/151.11; 340/172.5; 318/569, 574, 568

[56] References Cited

U.S. PATENT DOCUMENTS

| 3,701,888 | 10/1972 | McDaniel | 318/574 |
| 3,825,731 | 7/1974 | Kobayashi et al. | 318/569 X |
| 3,872,808 | 3/1975 | Wurst | 112/158 E |
| 3,931,615 | 1/1976 | Oliver | 340/172.5 |
| 3,982,491 | 9/1976 | Herzer et al. | 112/121.12 |
| 4,025,838 | 5/1977 | Watanabe | 318/568 |

FOREIGN PATENT DOCUMENTS 2,702,488 7/1977 Fed. Rep. of Germany ....... 112/158 E Primary Examiner—Peter Nerbun
Attorney, Agent, or Firm—Birch, Stewart, Kolasch and Birch

[57] ABSTRACT

In a sewing machine including a static memory for storing digital information related to the positional co-ordinates for each stitch of a predetermined stitch pattern, a dynamic memory such as a shift register is provided for temporarily storing the digital information derived from the static memory. Output signals of the dynamic memory are applied to a needle positioning mechanism and a work feed mechanism through driving means. In a preferred form, input means are provided for modifying the digital information temporarily stored in the dynamic memory, thereby modifying the stitch pattern.

23 Claims, 19 Drawing Figures

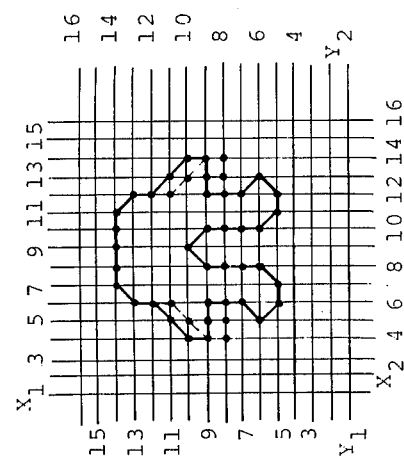
FIG. 5
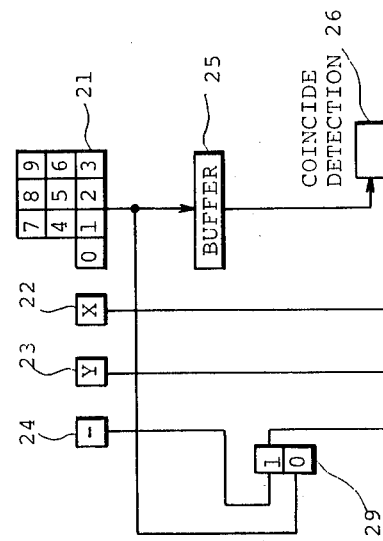
FIG. 4
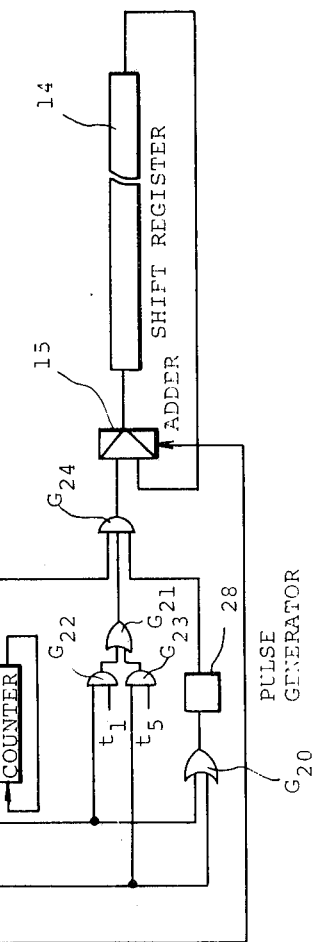

|     | $R_8$ | 7 | 6 | 5 | 4 | 3 | 2 | $R_1$ |
|-----|---|---|---|---|---|---|---|---|
| $N_1$ | 0 | 0 | 1 | 1 | 0 | 1 | 1 | 1 |
| $N_2$ | 1 | 0 | 1 | 0 | 0 | 0 | 1 | 1 |
| $N_3$ | 1 | 0 | 1 | 0 | 1 | 1 | 0 | 0 |
| $N_4$ | 1 | 0 | 1 | 0 | 1 | 0 | 1 | 1 |
| $N_5$ | 1 | 1 | 1 | 0 | 1 | 0 | 1 | 0 |

FIG. 9

|       |          | $A_5$ | $A_4$ | $A_3$ | $A_2$ | $A_1$ |          |
|-------|----------|---|---|---|---|---|----------|
| $N_1$ | $D_1$    | 0 | 0 | 0 | 0 | 1 | $T_1$    |
| $N_2$ | $D_2$    | 0 | 0 | 0 | 1 | 0 | $T_2$    |
|       |          | 0 | 0 | 0 | 1 | 1 | $T_3$    |
| $N_3$ | $D_3$    | 0 | 0 | 1 | 0 | 0 | $T_4$    |
|       |          | 0 | 0 | 1 | 0 | 1 | $T_5$    |
|       | ⋮        |   |   |   |   |   |          |
| $N_{16}$ | $D_{16}$ | 1 | 1 | 1 | 1 | 0 | $T_{30}$ |
|       |          | 1 | 1 | 1 | 1 | 1 | $T_{31}$ |

FIG. 10

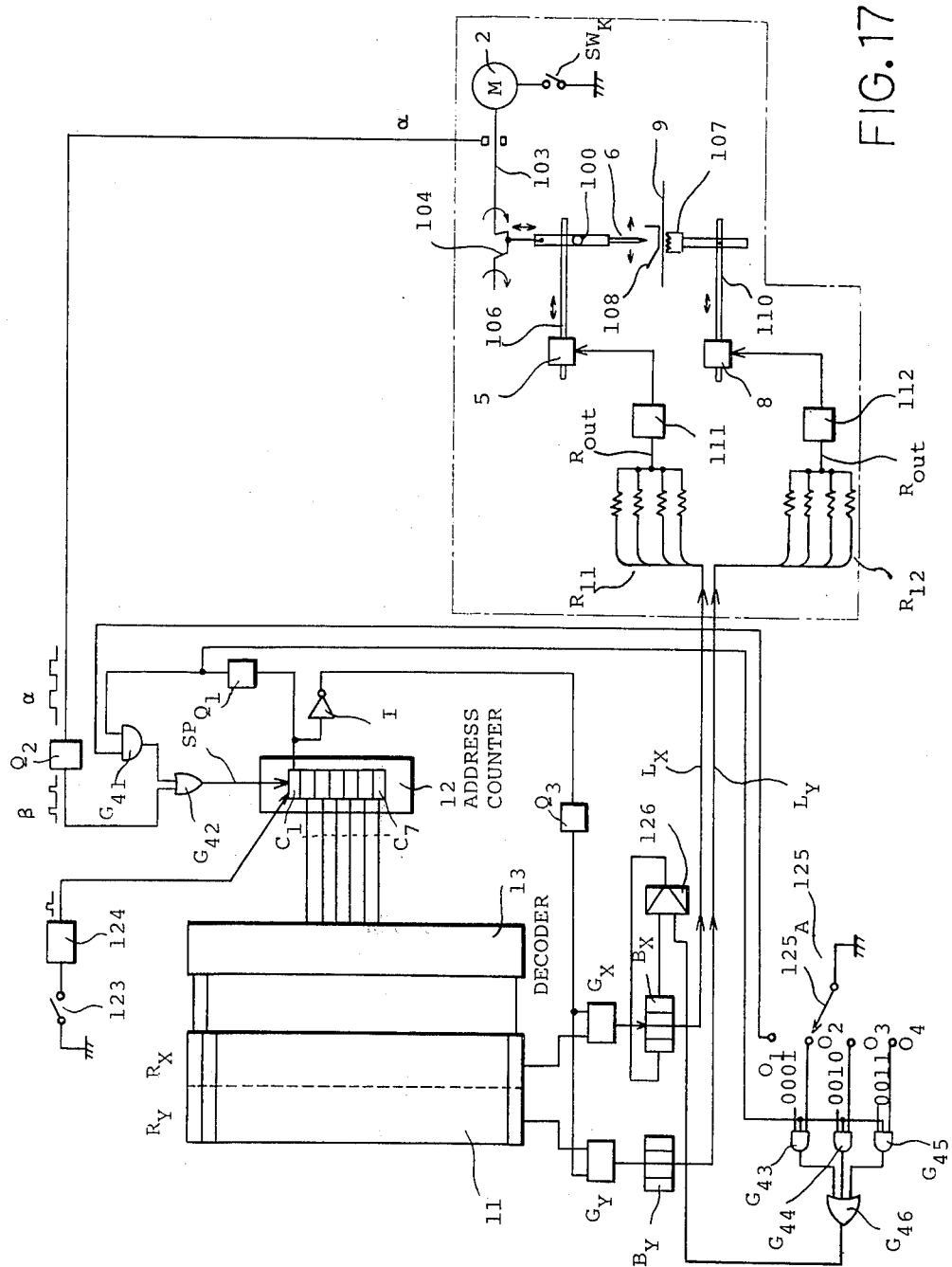

STITCH PATTERN FORMING CONTROL IN A SEWING MACHINE

BACKGROUND OF THE INVENTION

The present invention relates to an electronic sewing machine, wherein a predetermined stitch pattern is automatically formed through the use of a needle positioning mechanism and a work feed mechanism controlled by digital information stored in a static memory installed within the electronic sewing machine.

A typical control system of the above-mentioned sewing machine is disclosed in John W. Wurst, U.S. Pat. No. 3,855,956 "SEWING MACHINE STITCH PATTERN GENERATION FROM STITCH DATA STORED IN STATIC MEMORY", patented on Dec. 24, 1974.

In this prior art system, digital information related to the positional coordinates for each stitch of a predetermined stitch pattern is stored in a read only memory (ROM). The digital information stored in the ROM is applied directly to a driving means for controlling movement of stitch forming instrumentality of the sewing machine. Since the ROM output is applied directly to the driving means, the packaging of the ROM-IC should be the socket type to allow the exchange of the ROM when various stitch patterns are desired to be formed. However, this is not favorable in the sewing machine, because oscillation caused by the stitch forming instrumentality will produce ill connection between the ROM and the control circuit assembly.

Moreover, it is desired to modify a portion of the stitch pattern or to enlarge the stitch width when it is required. In the conventional prior art system, the modification of the stitch pattern is not obtainable because the digital information stored in the ROM is applied directly to the driving means associated with the stitch forming instrumentality.

OBJECTS AND SUMMARY OF THE INVENTION

Accordingly, an object of the present invention is to provide a novel control system for generating a stitch pattern in an electronic sewing machine.

Another object of the present invention is to provide a stitch pattern forming control system, which can modify the stitch pattern stored in a static memory installed within an electronic sewing machine.

Still another object of the present invention is to provide a stitch pattern forming control system, which can enlarge the stitch width when it is desired.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a dynamic memory such as a shift register is provided for temporarily storing the digital information derived from the static memory installed within the electronic sewing machine. Output signals of the dynamic memory are applied to a needle positioning mechanism and a work feed mechanism through driving means in order to form a desired stitch pattern.

In a preferred form, input means are provided for modifying the digital information temporarily stored in the dynamic memory, thereby modifying a portion of the stitch pattern or enlarging the stitch width when it is required. In another preferred form, a read only memory (ROM) is employed as the static memory, which stores the digital information relating to the absolute position coordinates of the first stitch and the digital information relating to the relative position coordinates of succeeding stitches of a predetermined stitch pattern. Output signals of the ROM are applied to buffer registers, of which contents are circulated through adders functioning to provide the absolute position coordinates in accordance with the relative position coordinates. With such an arrangement the ROM capacity can be reduced.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

FIG. 4 is a block diagram of another embodiment of modification means employed in the stitch pattern forming system of FIG. 1;

FIG. 5 is a chart for explaining operation of the modification means of FIG. 4;

FIG. 9 is a chart for explaining contents stored in a read only memory employed in the stitch pattern forming system of FIG. 8;

FIG. 10 is a chart for explaining operation of the stitch pattern forming system of FIG. 8;

FIG. 17 is a block diagram of yet another embodiment of a stitch pattern forming system of the present invention, which can provide the stitch pattern of the enlarged stitch width;

DESCRIPTION OF THE PREFERRED EMBODIMENTS

Figure 1:
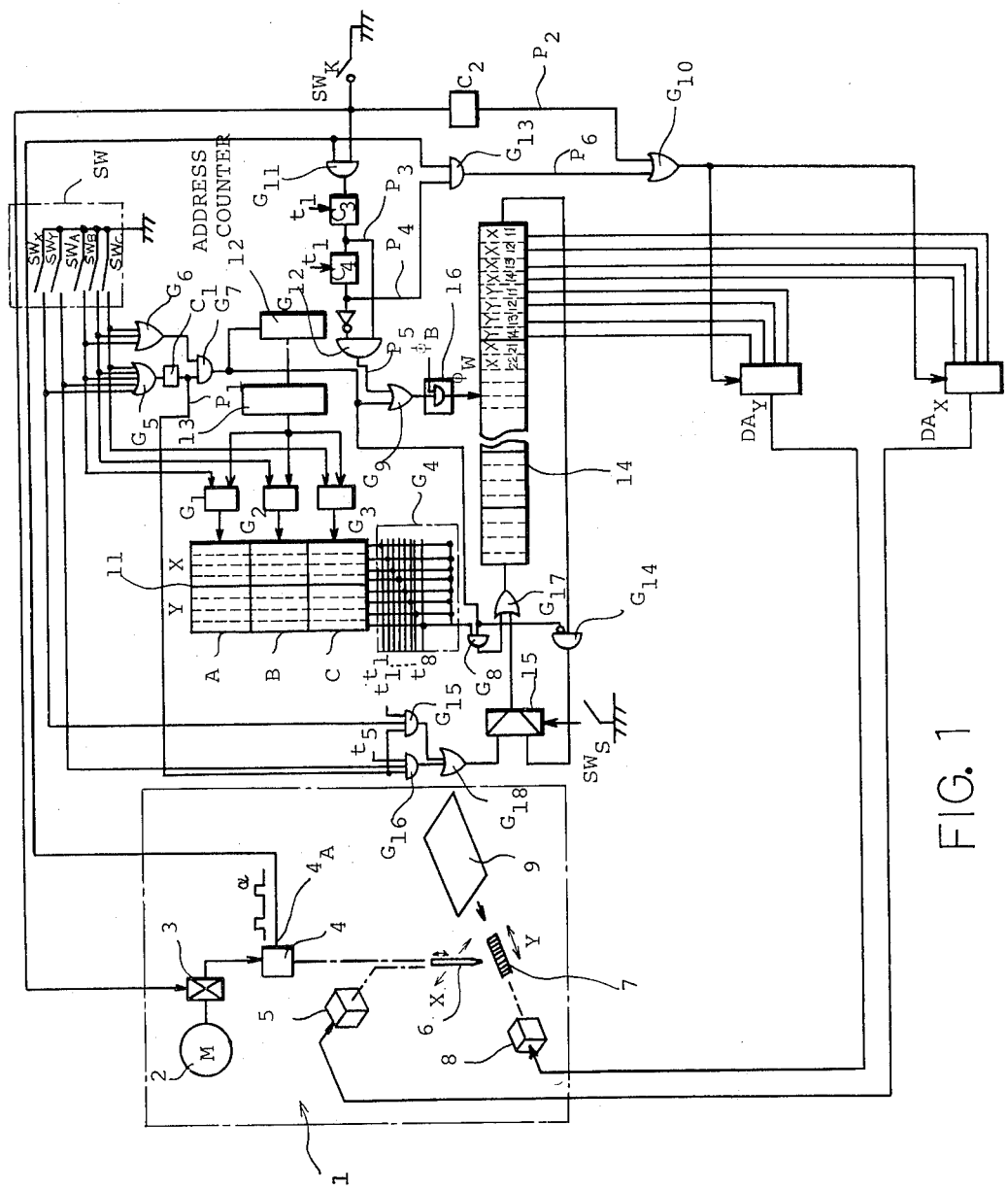
FIG. 1 is a block diagram of an embodiment of a stitch pattern forming system of the present invention.
Figure 2:
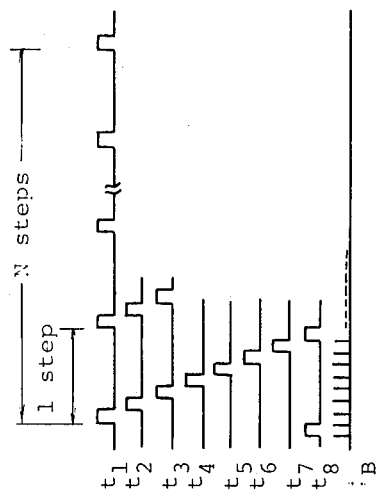
FIG. 2 is a time chart for explaining operation of the stitch pattern forming system of FIG. 1.
Figure 3:
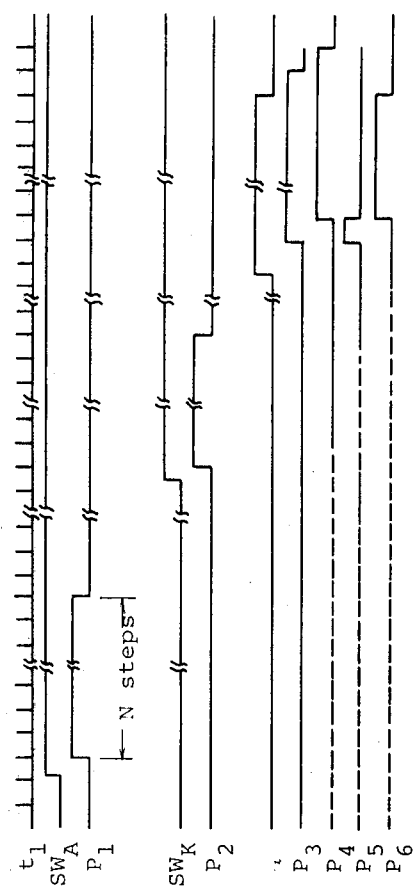
FIG. 3 is a time chart for explaining operation of the stitch pattern forming system of FIG. 1.

FIG. 1 shows an embodiment of a stitch pattern forming system of the present invention, and FIGS. 2 and 3 show various signals occurring within the system of FIG. 1.

A stitch forming section 1 mainly comprises a motor 2, a clutch mechanism 3, a needle driving unit 4 driven by the motor 2 through the clutch mechanism 3, a needle position control unit 5, a needle 6, a work feed mechanism 7, and a work feed control unit 8. The needle driving unit 4 is so constructed as to develop a synchronization pulse signal for controlling operation of other parts of the system. The reference numeral 9 represents a work on which a stitch pattern is formed.

The needle driving unit 4 is connected to receive the revolution of the motor 2 through the clutch mechanism 3, which transmits the motor revolution to the needle driving unit 4 only when a manual switch $SW_K$ is closed. The needle driving unit 4 develops the synchronization pulse signal via an output terminal $4_A$ in synchronization with the upward and downward movement of the needle 6.

The needle position control unit 5 functions to control the needle position along the X axis within a predetermined range in response to a control signal derived from a digital-analogue converter $DA_X$. The work feed control unit 8 functions to control the position of the work 9 along the Y axis within a predetermined range in response to a control signal derived from a digital-to-analogue converter $DA_Y$.

A read only memory (ROM) 11 is provided for storing digital information related to the positional coordinates for each stitch of a predetermined stitch pattern. The ROM 11 stores the digital information related to the needle position along the X axis and the digital information related to the work position along the Y axis at different 16 values, respectively. That is, the ROM 11 determines a matrix of 16 × 16 structure, the stitch being formed at the cross point of the 16 × 16 matrix. Therefore, one step of the ROM 11 comprises 8 bits, 4 for the X axis and remaining 4 for the Y axis. Each step corresponds to the respective stitch positions and, therefore, the ROM 11 includes N steps when a predetermined stitch pattern is made of N stitches.

In this embodiment, the ROM 11 includes digital information related to three kinds of stitch patterns A, B and C. When it is required, the ROM 11 can be the socket type to allow the exchange of the ROM in order to form numerous kinds of stitch patterns.

Selection switch means SW are provided for selecting a desired stitch pattern included within the ROM 11. A selection switch $SW_A$ selects the stitch pattern A included within the ROM 11 via an AND gate $G_1$, another selection switch $SW_B$ selects the stitch pattern B through another AND gate $G_2$, and still another selection switch $SW_C$ selects the stitch pattern C through still another AND gate $G_3$, respectively. The selection switch means SW further include switches $SW_X$ and $SW_Y$, which will be described later.

An address counter 12 made of a binary counter is provided for progressively advancing the N steps contained within the ROM 11. Output signals of the address counter 12 are applied to a decoder 13, of which output signals are applied to one input terminals of the AND gates $G_1$, $G_2$ and $G_3$. The AND gates $G_1$, $G_2$ and $G_3$ function to advance only the steps included within the selected stitch pattern A, B or C determined by the selection switch means SW. For example, the steps included within the stitch pattern A are advanced through the AND gate $G_1$ when the selection switch $SW_A$ is closed.

Respective output signals of the selection switches $SW_A$, $SW_B$ and $SW_C$ are also applied to OR gates $G_5$ and $G_6$. An output signal of the OR gate $G_5$ enables a pulse generator $C_1$, which develops one pulse $P_1$ having a pulse width corresponding to a time period required for advancing the N steps. Thus obtained pulse $P_1$ and an output signal of the OR gate $G_6$ are applied to an AND gate $G_7$, an output signal of which is applied to the address counter 12.

When, for instance, the selection switch $SW_A$ is closed, the address counter 12 begins its count operation and the stitch pattern A is progressively advanced in response to the count operation of the address counter 12. The count operation is terminated when the N steps have been advanced, because the pulse $P_1$ disappears.

The digital information derived from the ROM 11 is introduced into a dynamic memory means 14 made of a shift register. The shift register 14 comprises N × M D-type flip-flops in the case when the stitch patterns A, B and C include N steps, at maximum, and the respective steps include M bits. In this embodiment, the respective steps include 4 bits information as the position information along the X axis and other 4 bits information as the position information along the Y axis. Therefore, the shift register 14 includes 8 × N D-type flip-flops connected in a series fashion.

The shift register 14 stores the digital information contained within the respective steps of the ROM 11. That is, the digital information related to the position information along the X axis is stored at $X_{11}$-$X_{14}$, $X_{21}$-$X_{24}$, ..., and $X_{N1}$-$X_{N4}$, and the digital information related to the position information along the Y axis is stored at $Y_{11}$-$Y_{14}$, $Y_{21}$-$Y_{24}$, ..., and $Y_{N1}$-$Y_{N4}$. The contents of the shift register 14 are shifted downward in response to a clock pulse $\phi_W$.

The digital information stored in the ROM 11 must be introduced into the shift register 14 in a series fashion. A gate circuit $G_4$ controlled by timing signals $t_1$-$t_8$ is provided for performing the above introduction operation. An output signal of the gate circuit $G_4$ is applied to one input terminal of an AND gate $G_8$. Another input terminal of the AND gate $G_8$ is connected to receive the output signal of the AND gate $G_7$ which is the pulse $P_1$ of the N step width.

An output signal of the AND gate $G_8$ is introduced into the shift register 14 via an OR gate $G_{17}$. The contents of the shift register 14 are circulated for sustaining purposes through a gate $G_{14}$, an adder 15 and the OR gate $G_{17}$. The clock pulses $\phi_W$ are provided for shifting the contents of the shift register 14 during the introduction operation. That is, a clock pulse generator 16 is so constructed as to develop M × N clock pulses $\phi_W$.

The clock pulse generator 16 mainly comprises an AND gate which develops a product of a clock $\phi_B$, which is developed once every bit, and the pulse $P_1$ applied from the AND gate $G_7$ through an OR gate $G_9$. Therefore, the clock pulse generator 16 develops 8 × N clock pulses during the N step time period. The number $8 \times N$ corresponds to the bit capacity of the shift register 14.

The gate $G_{14}$ functions to erase the digital information related to the stitch pattern A stored in the shift register 14 while the digital information related to the stitch pattern B is introduced into the shift register 14, when, for example, the stitch pattern selection is changed from the stitch pattern A to the stitch pattern B. That is, the gate $G_{14}$ is connected to receive an inverted signal of the pulse $P_1$ derived from the AND gate $G_7$ at its one input terminal. The gate $G_{14}$ is not conductive during the N step time period when any one of the selection switches $SW_A$, $SW_B$ and $SW_C$ is closed. The preceding contents of the shift register 14 are erased while the gate $G_{14}$ is not conductive.

The digital information stored in the shift register 14 is applied to the stitch forming unit 1 in the following manner.

The four bit digital information related to the positional coordinate along the X axis is applied to the digital-to-analogue converter $DA_X$, and the four bit digital information related to the positional coordinate along the Y axis is applied to the digital-to-analogue converter $DA_Y$. The digital-to-analogue converter $DA_X$ functions to convert the binary signals $X_{11}$–$X_{14}$ into an analogue value related to the positioning of the needle 6 along the X axis. The digital-to-analogue converter $DA_Y$ functions to convert the binary signals $Y_{11}$–$Y_{14}$ into an analogue value suited for positioning the work 9 along the Y axis.

The manual switch $SW_K$ enables the stitch forming section 1 and a pulse generator $C_2$. The pulse generator $C_2$ develops a pulse $P_2$ having a pulse width sufficient to position the needle 6 and the work 9 at a desired position corresponding to the digital information related to the first step. The pulse $P_2$ is applied to the digital-to-analogue converters $DA_X$ and $DA_Y$ through an OR gate $G_{10}$. The output signal of the OR gate $G_{10}$ functions as a control signal for determining whether the converters $DA_X$ and $DA_Y$ should be operative.

With such an arrangement, when the manual switch $SW_K$ is closed, the stitch forming section 1 is enabled and the converters $DA_X$ and $DA_Y$ become operative to produce the analogue signals related to the positional coordinates of the first step. The output signals of the converters $DA_X$ and $DA_Y$ are applied to the needle position control unit 5 and the work feed control unit 8, respectively.

The output of the manual switch $SW_K$ is also applied to one input terminal of an AND gate $G_{11}$. Another input terminal of the AND gate $G_{11}$ is connected to the output terminal $4_A$ of the needle driving unit 4 included within the stitch forming section 1. An output signal of the AND gate $G_{11}$ is applied to a D-type flip-flop $C_3$. The D-type flip-flop $C_3$ and another D-type flip-flop $C_4$ are controlled by a bit signal $t_1$.

An output signal $P_3$ of the D-type flip-flop $C_3$ is applied to the D-type flip-flop $C_4$ and one input terminal of an AND gate $G_{12}$. An output signal $P_4$ of the D-type flip-flop $C_4$ is applied to the other input terminal of the AND gate $G_{12}$ through an inverter, and to an input terminal of an AND gate $G_{13}$. An output signal $P_5$ of the AND gate $G_{12}$ is applied to the OR gate $G_9$.

Another input terminal of the AND gate $G_{13}$ is connected to the output terminal $4_A$ of the needle driving unit 4 included within the stitch forming section 1. An output signal $P_6$ of the AND gate $G_{13}$ is applied to the OR gate $G_{10}$.

The above-mentioned AND gates $G_{11}$, $G_{12}$, $G_{13}$ and the D-type flip-flops $C_3$ and $C_4$ function, in combination, to progressively develop the digital information stored in the shift register 14 after the second step in response to the synchronization pulse signal $\alpha$ derived from the needle driving unit 4 included within the stitch forming section 1.

The synchronization pulse signal $\alpha$ is developed in synchronization with the upward and downward movement of the needle 6 when the stitch forming section 1 is enabled by depression of the manual switch $SW_K$.

The D-type flip-flop $C_3$ is set at the timing $t_1$ through the AND gate $G_{11}$ which is connected to receive the synchronization pulse signal $\alpha$ and the output of the manual switch $SW_K$. The set output signal $P_3$ of the D-type flip-flop $C_3$ and the inverted signal of the output signal $P_4$ of the D-type flip-flop $C_4$ are applied to the AND gate $G_{12}$ and, therefore, the AND gate $G_{12}$ develops the output signal $P_5$. The output signal $P_5$ is applied to the clock pulse generator 16 through the OR gate $G_9$.

The D-type flip-flop $C_4$ is set at the following timing $t_1$ and, therefore, the AND gate $G_{12}$ terminates the development of the output signal $P_5$. It will be clear that the output signal $P_5$ has the pulse width corresponding to the time period from the bit time $t_1$ to the bit time $t_8$, or, eight bit time period.

While the output signal $P_5$ bears the high level, the clock pulse generator 16 develops 8 clock pulses $\phi_W$ to be applied to the shift register 14. The contents of the shift register 14 are shifted right by 8 bits, whereby the digital information related to the second step of the stitch pattern is positioned at the rightmost portions of the shift register 14, which are connected to the converters $DA_X$ and $DA_Y$ for read out purposes.

On the other hand, the output signal $P_4$ is applied to the AND gate $G_{13}$, which develops the output signal $P_6$ in response to the synchronization pulse signal $\alpha$. The output signal $P_6$ is applied to the digital-to-analogue converters $DA_X$ and $DA_Y$ through the OR gate $G_{10}$, thereby operating the converters $DA_X$ and $DA_Y$. Under these conditions, analogue signals corresponding to the positional coordinates of the second step of the stitch pattern are applied to the needle position control unit 5 and the work feed control unit 8, respectively. The above-mentioned operation is repeated to output the contents stored in the shift register 14 in response to the synchronization pulse signal $\alpha$.

It will be noted that the time period (the output signal $P_5$) when the contents of the shift register 14 are shifted and the time period (the output signal $P_6$) when the analogue signals are applied from the converters $DA_X$ and $DA_Y$ to the stitch forming unit 1 do not overlap with each other. The digital-to-analogue converters $DA_X$ and $DA_Y$ can be of conventional constructions and hence the details thereof have been omitted for the purpose of simplicity.

The system of FIG. 1 further includes modification means for modifying the digital information temporarily stored in the shift register 14.

The modification means mainly include the adder 15 associated with the shift register 14, and switching means for controlling the operation of the adder 15 in order to modify the digital information related to the positional coordinates along the X axis and the Y axis. One input terminal of the adder 15 is connected to the circulation loop of the shift register 14 as already discussed above. The other input terminal of the adder 15 is connected to receive an output signal of an OR gate $G_{18}$ which receives output signals of AND gates $G_{15}$ and $G_{16}$.

The AND gate $G_{15}$ is connected to receive an output signal of a selection switch $SW_X$ for selecting the digital information related to the X axis, the pulse $P_1$ of the N step width derived from the pulse generator $C_1$ which is activated by the selection switch $SW_X$ via the OR gate $G_5$, and the timing signal $t_1$. The AND gate $G_{16}$ is connected to receive an output signal of a selection switch $SW_Y$ for selecting the digital information related to the Y axis, the pulse $P_1$ of the N step width derived from the pulse generator $C_1$ which is activated by the selection switch $SW_Y$ via the OR gate $G_5$, and a timing signal $t_5$. A selection switch $SW_S$ is provided for developing a subtracting command to the adder 15.

When the selection switch $SW_X$ is depressed (the selection switch $SW_X$ is open when the depression is released), the AND gate $G_{15}$ develops an addition command to the adder 15, through the OR gate $G_{18}$, in synchronization with the timing signal $t_1$. The digital information related to the X axis of the respective stitches is added by one during the circulation of the contents of the shift register 14, because the AND gate $G_{15}$ is conducted only at the timing $t_1$. That is, the stitch pattern is shifted by one along the X axis.

When the selection switch $SW_Y$ is depressed, the AND gate $G_{16}$ develops an additional command to the adder 15 in synchronization with the timing signal $t_5$. Therefore, the stitch pattern modified by one along the Y axis is obtained.

FIG. 4 shows another embodiment of the modification means. Like elements corresponding to those of FIG. 1 are indicated by like numerals.

The modification means of FIG. 4 can modify the stitch pattern at a desired position as shown by broken lines in FIG. 5.

The modification means of FIG. 4 can modify the digital information at a desired step stored in the shift register 14. The modification means mainly comprise a keyboard unit 21 including numeral keys for selecting the step number, a key 22 for selecting the digital information related to the stitch pattern information along the X axis, a key 23 for selecting the digital information related to the stitch pattern information along the Y axis, and a key 24 for developing a subtracting command to be applied to the adder 15.

Output signals of the keyboard unit 21 are applied to a buffer register 25, of which an output signal is applied to a coincide detection circuit 26. The coincide detection circuit 26 is connected to receive, at its other terminal, an output signal of a counter 27, which counts up every one step, thereby developing a detection signal when the contents of the counter 27 are identical with the step number selected by the keyboard unit 21.

An output signal of the key 22 is applied to an AND gate $G_{22}$, and an output signal of the key 23 is applied to an AND gate $G_{23}$. The output signals of the keys 22 and 23 are also applied to a pulse generator 28 through an OR gate $G_{20}$. Another input terminal of the AND gate $G_{22}$ receives the timing signal $t_1$, and another input terminal of the AND gate $G_{23}$ receives the timing signal $t_5$. Respective output signals of the AND gates $G_{22}$ and $G_{23}$ are applied to an AND gate $G_{24}$ through an OR gate $G_{21}$.

The AND gate $G_{24}$ receives, in addition to the output signal of the OR gate $G_{21}$, the detection signal derived from the coincide detection circuit 26 and an output signal of the pulse generator 28. An output signal of the AND gate $G_{24}$ is applied to one input terminal of the adder 15. The pulse generator 28 develops one pulse having a pulse width corresponding to a time period of N steps.

An output signal of the key 24 is applied to a set input terminal of an RS flip-flop 29, and the output signals of the keyboard unit 21 are applied to a reset input terminal of the RS flip-flop 29. A set output signal of the RS flip-flop 29 is applied to the adder 15 for performing the subtracting operation.

The adder 15 is interposed within the circulation loop of the shift register 14 as already discussed above in conjunction with FIG. 1.

Now assume the case when the modification is required to be conducted on the twenty-first step of the stitch pattern. The numeral keys "2" and "1" of the keyboard unit 21 are sequentially operated to introduce the information "21" into the buffer register 25. When the contents of the counter 27 become "21", the coincide detection circuit 26 develops the detection signal.

Under these conditions, when the key 22 is depressed, the AND gate $G_{22}$ develops the output signal at the timing $t_1$ and the pulse generator 28 is activated, whereby the AND gate $G_{24}$ is conducted to add "1" to the digital information related to the X axis of the twenty-first step. Similarly, when the switch information related to the Y axis is desired to be modified, the key 23 is operated. When the subtraction is desired to be performed, the key 24 is operated.

The operation of the above-mentioned system will be described with reference to FIGS. 1, 2 and 3.

When the stitch pattern A stored in the ROM 11 is desired to be formed, the selection switch $SW_A$ is operated, whereby the digital information related to the stitch pattern A is introduced from the ROM 11 to the shift register 14 through the AND gate $G_8$ in response to the output signals of the address counter 12. Thus introduced stitch information is circulated and sustained by the shift register 14.

Figure 6:
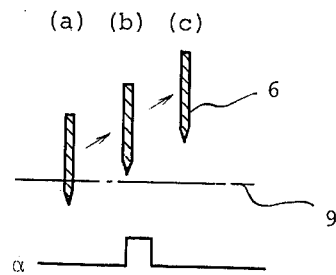
FIG. 6 is a chart for explaining operation of the stitch pattern forming system of FIG. 1.

When the manual switch $SW_K$ is operated, the revolution of the motor 2 is applied to the needle driving unit 4 through the clutch mechanism 3. The needle 6 is so controlled as to be positioned at the uppermost position at the initial condition. The synchronization pulse signal $\alpha$ is developed immediately after the needle 6 is separated from the work 9 as shown in FIG. 6. In FIG. 6, (a) shows the condition when the needle 6 is positioned at the lowermost position, (b) shows the condition when the needle 6 is just separated from the work 9, and (c) shows the condition when the needle 6 is positioned at the uppermost position.

It will be clear that the synchronization pulse signal $\alpha$ is not developed before the first penetration of the needle 6. However, the pulse $P_2$ is developed from the pulse generator $C_2$ in response to the operation of the manual switch $SW_K$ and, therefore, the digital-to-analogue converters $DA_X$ and $DA_Y$ are operated to activate the needle position control unit 5 and the work feed control unit 8 in accordance with the digital information corresponding to the first step. Consequently, the first stitch is formed at a desired position.

When the first step is completed, the synchronization pulse signal $\alpha$ is developed every time when the needle 6 is positioned at the condition shown in FIG. 6 (b). That is, the stitch information after the second step is controlled by the synchronization pulse signal $\alpha$.

More particularly, the D-type flip-flop $C_3$ is set by the synchronization pulse signal $\alpha$ through the AND gate $G_{11}$ at the timing $t_1$. The set output $P_3$ of the D-type flip-flop $C_3$ is applied to the AND gate $G_{12}$. The AND gate $G_{12}$ develops the output signal $P_5$, or, the logical product $P_3 \cdot P_4$, to the clock pulse generator 16. The clock pulse generator 16 develops 8 clock pulses $\phi_W$ to the shift register 14 in order to shift the contents of the shift register 14 right by 8 bits.

The AND gate $G_{13}$ is conducted to develop the signal $P_6$, or, the logical product $\alpha \cdot P_4$, in order to activate the digital-to-analogue converters $DA_X$ and $DA_Y$. In this manner, the stitch information related to the second step is applied to the needle position control unit 5 and the work feed control unit 8 in order to form the second stitch.

The above-mentioned operation is repeated in response to the synchronization pulse signal $\alpha$, thereby forming the stitch pattern corresponding to the digital information stored in the shift register 14. The above system can perform the accurate operation even when the ROM 11 is the socket type, because the information is derived from the shift register 14, not from the ROM 11, while the sewing machine performs the stitch forming operation.

Figure 7:
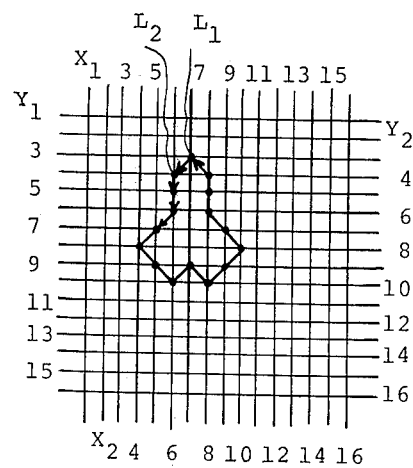
FIG. 7 is a chart showing an example of stitch patterns.

In the foregoing embodiments, the ROM 11 stores the digital information related to the absolute position coordinate of the needle 6, and the digital information related to the feed length of the work 9. The respective steps of the ROM 11 are made of 8 bits because the needle position is controlled at different 16 points and the work position is also controlled at different 16 points as shown in FIG. 7. Therefore, the ROM capacity is required to be large.

Figure 8:
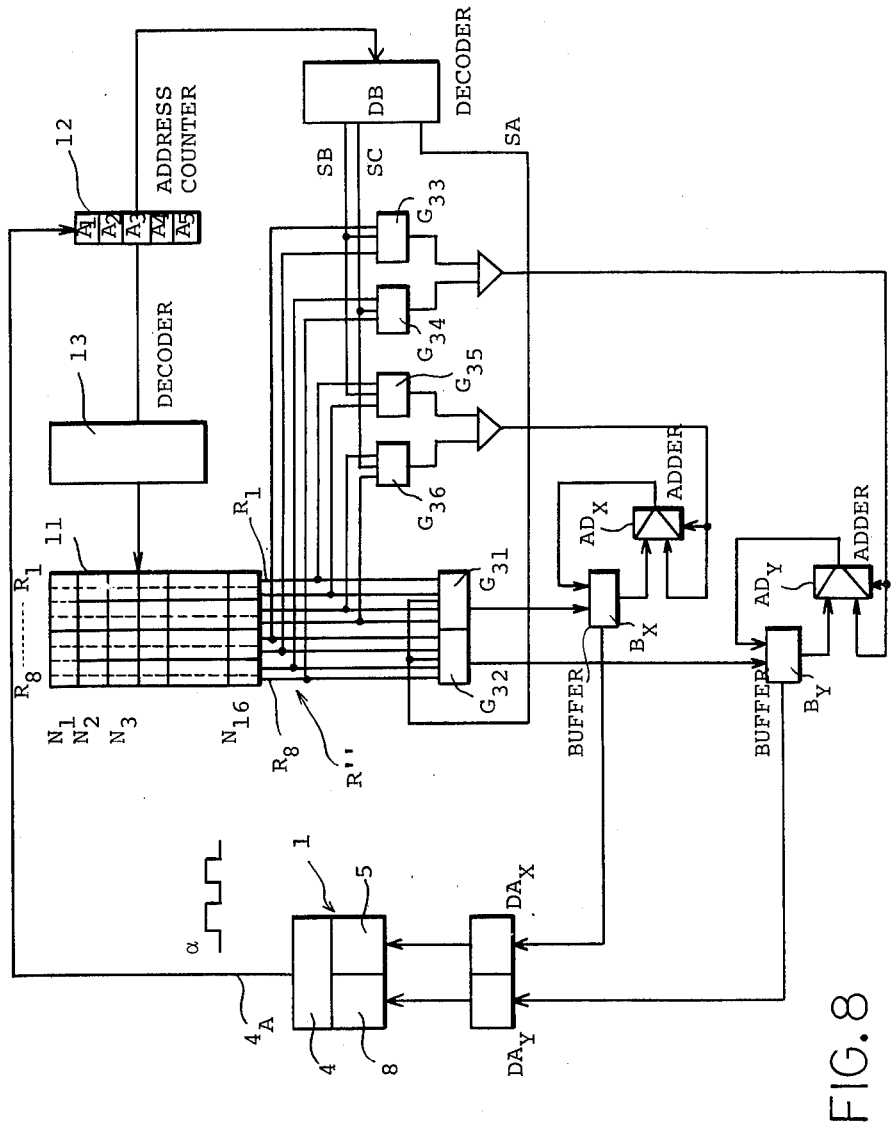
FIG. 8 is a block diagram of another embodiment of a stitch pattern forming system of the present invention.

FIG. 8 shows another embodiment of the stitch pattern forming system of the present invention, which minimizes the ROM capacity. Like elements corresponding to those of FIG. 1 are indicated by like numerals.

The stitch forming section 1 mainly comprises the needle driving unit 4 driven by the motor through the clutch mechanism, the needle position control unit 5, and the work feed control unit 8. The needle driving unit 4 develops the synchronization pulse signal $\alpha$ through the output terminal $4_A$ in synchronization with the upward and downward movement of the needle, as already discussed above in conjunction with FIG. 1.

The ROM 11 stores the digital information related to the stitch pattern. The ROM 11 includes 16 steps $N_1$, $N_2$, ..., $N_{16}$, and the respective steps develop 8 bit output signals. The first step $N_1$ stores the digital information related to the absolute position of the first stitch. The following steps store the digital information related to the relative position, or the variations with respect to the preceding stitch position.

Referring again to FIG. 7, the stitch pattern is formed in the order of $L_1, L_2, ..., L_{17}(L_1)$. The respective stitch positions can be tabulated as follows in the absolute values.

TABLE I
(STITCH COORDINATES OF THE STITCH PATTERN OF FIGURE 7)

| L | X | Y |
|---|---|---|
| 1 | 7 | 3 |
| 2 | 6 | 4 |
| 3 | 6 | 5 |
| 4 | 6 | 6 |
| 5 | 5 | 7 |
| 6 | 4 | 8 |
| 7 | 5 | 9 |
| 8 | 6 | 10 |
| 9 | 7 | 9 |

TABLE I-continued
(STITCH COORDINATES OF THE STITCH PATTERN OF FIGURE 7)

| L | X | Y |
|---|---|---|
| 10 | 8 | 10 |
| 11 | 9 | 9 |
| 12 | 10 | 8 |
| 13 | 9 | 7 |
| 14 | 8 | 6 |
| 15 | 8 | 5 |
| 16 | 8 | 4 |
| 17 | 7 | 3 |

To form the stitch pattern shown in FIG. 7, the ROM 11 stores the digital information in such a manner as shown in FIG. 9.

The first step $N_1$ stores the digital information related to the absolute position of the first stitch $L_1$, that is, X = 7 and Y = 3, in the binary notation. More particularly, the digital information "0111" is stored in $R_4$ through $R_1$, and the digital information "0011" is stored in $R_8$ through $R_5$. That is, the first stitch $L_1$ occupies 8 bits.

The following steps store the digital information related to the relative position corresponding to the differences from the preceding stitch position. That is, the digital information related to the second stitch is X = −1 and Y = +1, because the first stitch position $L_1$ is X = 7, Y = 3 and the second stitch psotiion $L_2$ is X = 6, Y = 4.

The relative position value is represented in a following manner by 2 bits.

TABLE II
(RELATIVE POSITION NOTATION)

| | $B_2$ | $B_1$ |
|---|---|---|
| NO VARIATION | 0 | 0 |
| NOT DETERMINED | 0 | 1 |
| ADD ONE (1) | 1 | 0 |
| SUBTRACT ONE (1) | 1 | 1 |

In accordance with the above notation, the second step $N_2$ of the ROM 11 stores the digital information "11" corresponding to X = −1 at the $R_2$ and $R_1$, and the digital information "10" corresponding to Y = +1 at the $R_6$ and $R_5$. Since the each information is represented by two bits, the $R_3$, $R_4$, $R_7$ and $R_8$ of the second step $N_2$ are not required to form the second stitch $L_2$. Therefore, the $R_3$, $R_4$, $R_7$ and $R_8$ of the second step $N_2$ are used to store the digital information related to the third stitch $L_3$. The third stitch position $L_3$ is X = 6 and Y = 5 and, therefore, the digital information related to the third stitch is "00" for the X axis and "10" for the Y axis. The digital information "00" is stored at the $R_4$ and $R_3$ of the second step $N_2$, and the digital information "10" is stored at the $R_8$ and $R_7$.

In this way, the $R_1$, $R_2$, $R_5$ and $R_6$ of the third step $N_3$ store the digital information related to the fourth stitch $L_4$, and the $R_3$, $R_4$, $R_7$ and $R_8$ of the third step $N_3$ store the digital information related to the fifth stitch $L_5$ as shown in FIG. 9.

The address counter 12 is provided for progressively advancing the steps of the ROM 11 for read out purposes. The address counter 12 is connected to receive the synchronization pulse signals $\alpha$ through the output terminal $4_A$ in order to select desired addresses of the ROM 11 through the decoder 13 in sycnhronization with the movement of the needle. The address counter 12 includes 5 bits $A_1$ through $A_5$, thereby counting up the stitch forming steps to 31.

The address counter 12 and the decoder 13 are correlated with each other in such a manner as shown in FIG. 10.

When the contents of the bits $A_5$ through $A_1$ are "00001", a signal $D_1$ is developed to address the first step $N_1$ of the ROM 11. When the contents of the bits $A_5$ through $A_1$ are either "00010" or "00011", a signal $D_2$ is developed to address the second step $N_2$ of the ROM 11. It will be clear from FIG. 10 that 2 stitches are formed by 1 step after the second step.

The output lines R" ($R_1$ through $R_8$) of the ROM 11 are connected to a control circuit described below for activating the needle position control unit 5 and the work feed control unit 8 via the converters $DA_X$ and $DA_Y$.

The control circuit mainly comprises gate circuits $G_{31}$, $G_{32}$, $G_{33}$, $G_{34}$ $G_{35}$ and $G_{36}$, a decoder circuit DB, a buffer memory $B_X$ of 4 bits for temporarily storing the digital information related to the X axis, another buffer memory $B_Y$ of 4 bits for temporarily storing the digital information related to the Y axis, an adder $AD_X$ associated with the buffer memory $B_X$, and another adder $AD_Y$ associated with the buffer memory $B_Y$.

The gate circuits $G_{31}$ and $G_{32}$ function to introduce the ROM outputs into the buffer memories $B_X$ and $B_Y$, respectively. The gate circuit $G_{31}$ is connected to receive the ROM outputs through the output lines $R_1$-$R_4$, and a signal SA derived from the decoder circuit DB. The gate circuits $G_{32}$ is connected to receive the ROM outputs through the output lines $R_5$-$R_8$ and the signal SA derived from the decoder circuit DB. An output signal of the gate circuit $G_{31}$ is applied to the buffer memory $B_X$, and an output signal of the gate circuit $G_{32}$ is applied to the buffer memory $B_Y$.

The gate circuit $G_{33}$ is connected to receive the ROM outputs via the output lines $R_5$ and $R_6$, and a signal SB derived from the decoder circuit DB. The gate circuit $G_{34}$ is connected to receive the ROM outputs through the output lines $R_7$ and $R_8$, and a signal SC derived from the decoder circuit DB. The gate circuit $G_{35}$ receives the ROM outputs through the output lines $R_1$ and $R_2$, and the signal SB. The gate circuit $G_{36}$ receives the ROM outputs via the output lines $R_3$ and $R_4$, and the signal SC.

The adder $AD_X$ functions to develop an output signal by adding or subtracting the output signals of the gate circuits $G_{35}$ and $G_{36}$ to or from the contents of the buffer memory $B_X$. The adder $AD_Y$ functions to develop an output signal by adding or subtracting the output signals of the gate circuits $G_{33}$ and $G_{34}$ to or from the contents of the buffer memory $B_Y$. The output signals of the adders $AD_X$ and $AD_Y$ are fed back to the buffer memories $B_X$ and $B_Y$, respectively.

Figures 11, 12:
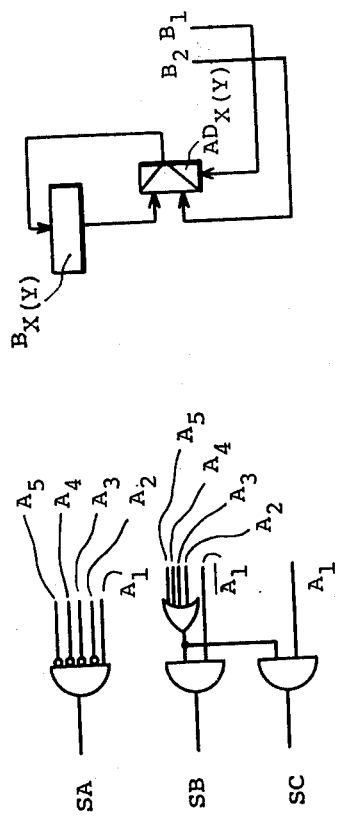
FIG. 11 is a block diagram of gate circuits for developing control signals occurred within the stitch pattern forming system of FIG. 8.
FIG. 12 is a block diagram of an adder employed within the stitch pattern forming system of FIG. 8.

The decoder circuit DB operates in response to the output signal of the address counter 12 to develop the signals SA, SB and SC. FIG. 11 shows a typical construction of the decoder circuit DB.

The signal SA is developed under the condition $A_5 \cdot A_4 \cdot A_3 \cdot A_2 \cdot A_1$, which corresponds to a timing $T_1$ at which the first step $N_1$ of the ROM 11 is developed as shown in FIG. 10. The gate circuits $G_{31}$ and $G_{32}$ are conducted by the signal SA, thereby introducing the absolute position information stored in the first step $N_1$ of the ROM 11 into the buffer memories $B_X$ and $B_Y$. The signal SB is developed under the condition $(A_5 + A_4 + A_3 + A_2) \cdot A_1$, which corresponds to timings $T_2 + T_4 + T_6 + T_8 + \ldots + T_{30}$ of FIG. 10. The gate circuits $G_{33}$ and $G_{35}$ are conducted by the signal SB, whereby the relative position information stored at the $R_1$ and $R_2$ of the ROM 11 is introduced into the adder $AD_X$, and the relative position information stored at the $R_5$ and $R_6$ of the ROM 11 is introduced into the adder $AD_Y$. Thus introduced signals are combined with the contents of the buffer memories $B_X$ and $B_Y$ at the adders $AD_X$ and $AD_Y$, and the resultant signals are again stored at the buffer memories $B_X$ and $B_Y$, respectively.

The signal SC is developed under the condition $(A_5 + A_4 + A_3 + A_2) \cdot A_1$, which corresponds to timings $T_3 + T_5 + T_7 + T_9 + \ldots + T_{31}$ of FIG. 10. The gate circuits $G_{34}$ and $G_{36}$ are conducted by the signal SC, whereby the relative position information stored at the $R_3$ and $R_4$ of the ROM 11 is introduced into the adder $AD_X$, and the relative position information stored at the $R_7$ and $R_8$ of the ROM 11 is introduced into the adder $AD_Y$. Thus introduced signals are combined with the contents of the buffer memories $B_X$ and $B_Y$ at the adders $AD_X$ and $AD_Y$, and the resultant information is again stored at the buffer memories $B_X$ and $B_Y$, respectively.

That is, the absolute position information stored at the first step $N_1$ of the ROM 11 is introduced into the buffer memroies $B_X$ and $B_Y$ through the gate circuits $G_{31}$ and $G_{32}$ at the timing $T_1$. In the following steps, the pair of the gate circuits $G_{33}$ and $G_{35}$, and the pair of the gate circuits $G_{34}$ and $G_{36}$ are conducted alternately.

The relative position information along the X axis is introduced into the adder $AD_X$ through either the gate circuit $G_{35}$ or the gate circuit $G_{36}$. The adder $AD_X$ functions to apply the information $B_X + (R_2, R_1)$ or $B_X + (R_4, R_3)$ to the buffer memory $B_X$. More specifically, the buffer memory $B_X$ always stores the absolute position information of the respective stitches along the X axis of the stitch pattern.

The relative position information along the Y axis is introduced into the adder $AD_Y$ through either the gate circuit $G_{33}$ or the gate circuit $G_{34}$. The adder $AD_Y$ functions to provide the information $B_Y + (R_5, R_6)$ or $B_Y + (R_7, R_8)$. Therefore, the buffer memory $B_Y$ always stores the absolute position information of each stitch along the Y axis of the stitch pattern.

FIG. 12 shows a typical construction of the adders $AD_X$ and $AD_Y$.

The adders $AD_X$ and $AD_Y$ are connected to receive the subtraction command, which is the bit signal $B_1$ shown in the TABLE II.

The bit signal $B_2$ shown in the TABLE II is applied to the adders $AD_X$ and $AD_Y$ as the additional command. Therefore, the adders $AD_X$ and $AD_Y$ functions as the subtracting means when the bit signal $B_1$ is "1", and function as the adding means when the bit signal $B_1$ is "0".

More particularly, the operation of the adder $AD_X$ is summarized as follows:

$B_X + 0 \rightarrow B_X$ when $B_2 = 0, B_1 = 0$ $B_X + 1 \rightarrow B_X$ when $B_2 = 1, B_1 = 0$ $B_X - 1 \rightarrow B_X$ when $B_2 + 1, B_1 = 1$ The output signal of the buffer memory $B_X$ is applied to the needle position control unit 5 through the digital-to-analogue converter $DA_X$ to position the needle at a desired position to form a desired stitch. The output signal of the buffer memory $B_Y$ is applied to the work feed control unit 8 through the digital-to-analogue converter $DA_Y$ in order to position the work at a desired position.

In the foregoing embodiments, the needle position control unit 5 and the work feed control unit 8 are controlled by the signals representing the absolute position of each stitch. However, it is preferable in a particular sewing machine that the work feed is controlled by the relative position information, or the displacement value from the preceding stitch position.

Figure 13:
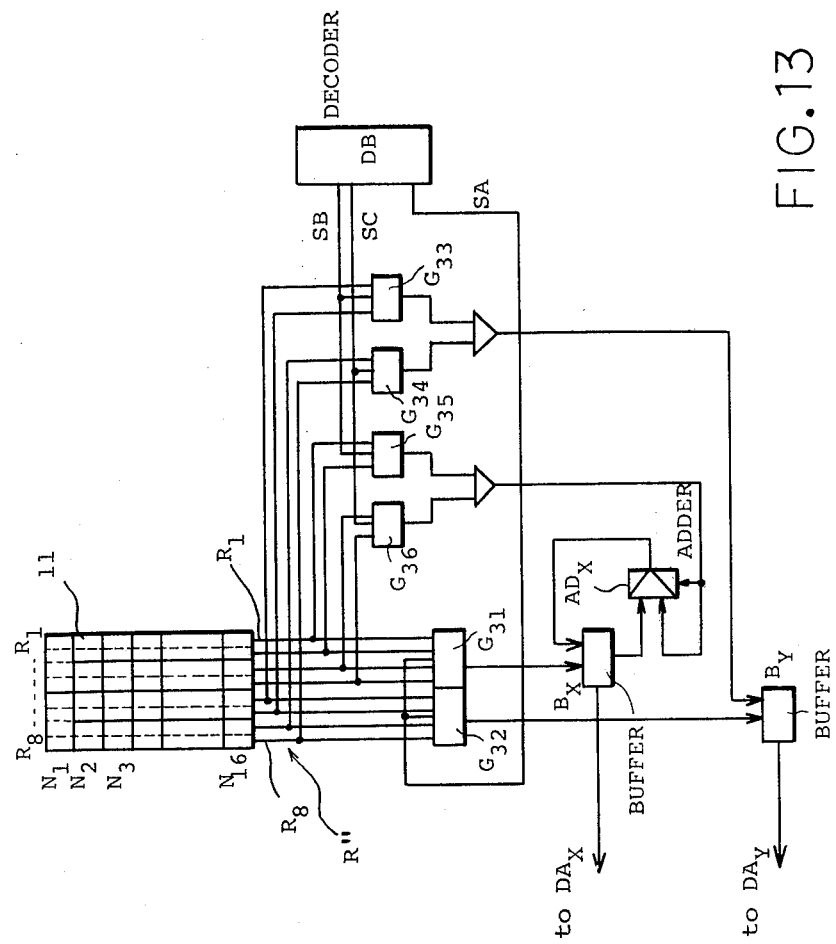
FIG. 13 is a block diagram of an essential part of still another embodiment of a stitch pattern forming system of the present invention.

FIG. 13 shows an example of the control system, wherein the work feed control unit 8 is controlled by the relative position information. Like elements corresponding to those of FIG. 8 are indicated by like numerals.

In the system of FIG. 13, the output signals of the gate circuits $G_{33}$ and $G_{34}$ are introduced into the buffer memory $B_Y$ without the intervention of the adder $AD_Y$. Therefore, the work position is controlled by the relative position information stored in the ROM 11.

Figure 15:
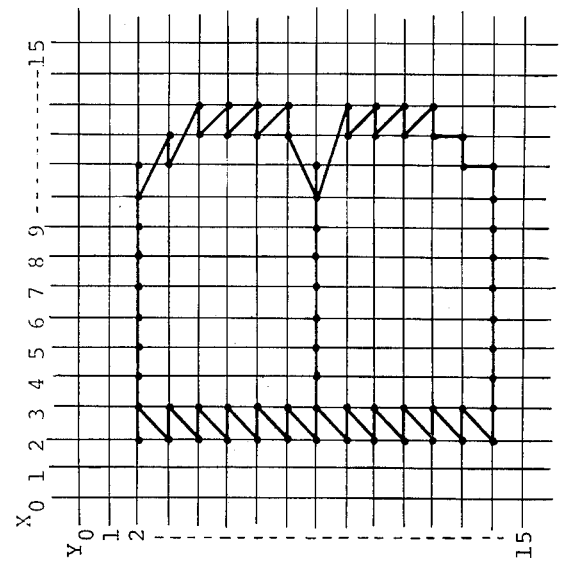
FIG. 15 is a chart showing an example of the stitch pattern formed in a stitch width enlarging mode.
Figure 14:
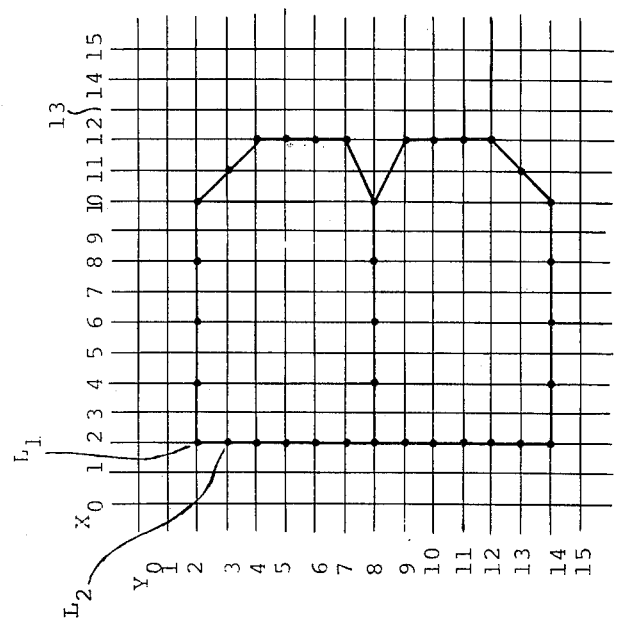
FIG. 14 is a chart showing a stitch pattern of a normal condition.
Figure 16:
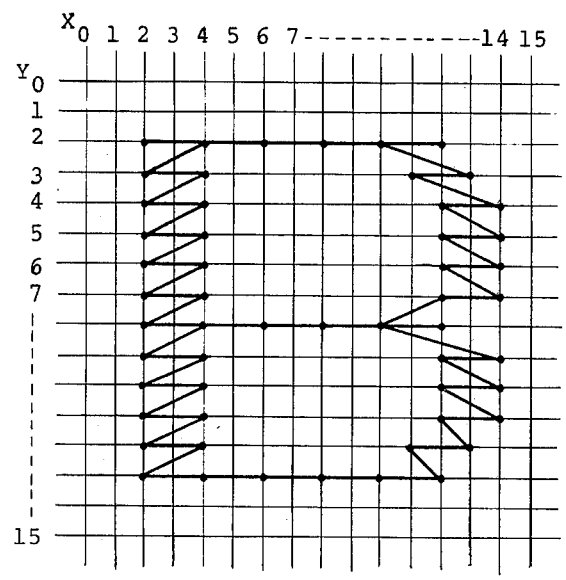
FIG. 16 is a chart showing another example of the stitch pattern formed in the stitch width enlarging mode.

In the foregoing system, the stitch pattern width is determined by the thread width as shown in FIG. 14. The following embodiment can modify or widening the stitch width as shown in FIGS. 15 and 16 in order to enhance the visibility.

FIG. 17 shows a typical construction of the system which can perform the above-mentioned stitch widening operation. Like elements corresponding to those of FIG. 8 are indicated by like numerals.

The system of FIG. 17 includes the stitch forming section 1 comprising the needle 6 driven by the motor 2 via a shaft 103 and a crankshaft 104 to move upward and downward. The needle 6 is also driven by the needle position control unit 5 made of a linear motor through a lever 106 to tilt around a support 100 in the direction along the X axis. The work 9 is driven to shift along the Y axis by the work feed control unit 8 made of a linear motor through a lever 110 and a shifting means 107. The work 9 is supported between the shifting means 107 and a depression means 108 during the shift operation.

The linear motor 5 is connected to receive an output signal of an amplifier 111 connected to a resistor group $R_{11}$, and the linear motor 8 is connected to receive an output signal of an amplifier 112 connected to a resistor group $R_{12}$. The resistor groups $R_{11}$ and $R_{12}$ include four resistors of which resistance values are R, 2R, 4R and 8R, whereby output currents $R_{out}$ are varied in accordance with the combined resistance value selected by control signals. With such an arrangement, the needle position and the work position are controlled at different 16 points as already discussed above with reference to FIGS. 1 and 8. The resistor group $R_{11}$ corresponds to the digital-to-analogue converter $DA_X$ of FIGS. 1 and 8, and the resistor group $R_{12}$ corresponds to the digital-to-analogue converter $DA_Y$ of FIGS. 1 and 8.

Figures 18, 19:
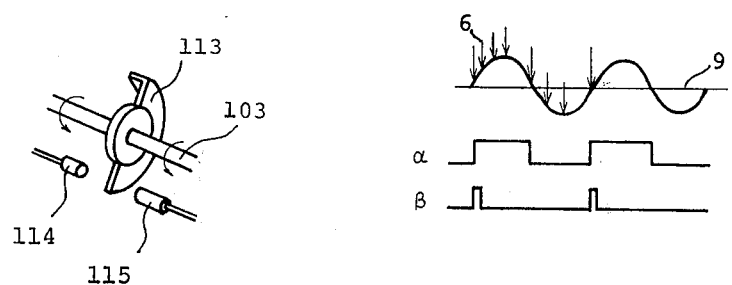
FIG. 18 is a perspective view of an embodiment of a synchronization signal generator employed in the stitch pattern forming system of FIG. 17.
FIG. 19 is a chart for explaining operation of the stitch pattern forming system of FIG. 17.

The synchronization pulse signal $\alpha$ is developed in synchronization with the revolution of the shaft 103 connected to the motor 2. FIG. 18 shows a synchronization pulse signal developing assembly.

A semicircular plate 113 is fixed to the shaft 103 in such a manner as to rotate in unison with the motor rotation. Light emitting means 114 and light responsive means 115 are arranged to confront each other with the intervention of the semicircular plate 113. Output signals from the light responsive means 115 are used to develop the synchronization pulse signal $\alpha$.

FIG. 19 shows the relationship between the needle movement and the generation of the synchronization pulse signal $\alpha$. The semicircular plate 113 is so arranged that the synchronization pulse signal $\alpha$ is developed while the needle 6 is positioned above the work 9, and the synchronization pulse signal $\alpha$ is not developed while the needle 6 is positioned below the work 9.

Referring again to FIG. 14, now assume that the stitches are formed in the order of $L_1$, $L_2$, ... The absolute position coordinates of the respective stitches are stored in the ROM 11 in the binary notation as shown in the following TABLE III.

TABLE III (CONTENTS OF ROM 11 TO FORM STITCH PATTERN SHOWN IN FIGURE 14)

| $R_Y$ | | | | $R_X$ | | | | |
|---|---|---|---|---|---|---|---|---|
| 0 | 0 | 1 | 0 | 0 | 0 | 1 | 0 | 1 |
| 0 | 0 | 1 | 1 | 0 | 0 | 1 | 0 | 2 |
| 0 | 1 | 0 | 0 | 0 | 0 | 1 | 0 | 3 |
| 0 | 1 | 0 | 1 | 0 | 0 | 1 | 0 | 4 |
| 0 | 1 | 1 | 0 | 0 | 0 | 1 | 0 | 5 |
| 0 | 1 | 1 | 1 | 0 | 0 | 1 | 0 | 6 |
| 1 | 0 | 0 | 0 | 0 | 0 | 1 | 0 | 7 |
| 1 | 0 | 0 | 1 | 0 | 0 | 1 | 0 | 8 |
| 1 | 0 | 1 | 0 | 0 | 0 | 1 | 0 | 9 |
| 1 | 0 | 1 | 1 | 0 | 0 | 1 | 0 | 10 |
| 1 | 1 | 0 | 0 | 0 | 0 | 1 | 0 | 11 |
| 1 | 1 | 0 | 1 | 0 | 0 | 1 | 0 | 12 |
| 1 | 1 | 1 | 0 | 0 | 0 | 1 | 0 | 13 |
| 1 | 1 | 1 | 0 | 0 | 1 | 0 | 0 | 14 |
| 1 | 1 | 1 | 0 | 0 | 1 | 1 | 0 | 15 |
| 1 | 1 | 1 | 0 | 1 | 0 | 0 | 0 | 16 |
| 1 | 1 | 1 | 0 | 1 | 0 | 1 | 0 | 17 |
| 1 | 1 | 0 | 1 | 1 | 0 | 1 | 1 | 18 |
| 1 | 1 | 0 | 0 | 1 | 1 | 0 | 0 | 19 |
| 1 | 0 | 1 | 1 | 1 | 1 | 0 | 0 | 20 |
| 1 | 0 | 1 | 0 | 1 | 1 | 0 | 0 | 21 |
| 1 | 0 | 0 | 1 | 1 | 1 | 0 | 0 | 22 |
| 1 | 0 | 0 | 0 | 0 | 0 | 1 | 0 | 23 |
| 1 | 0 | 0 | 0 | 1 | 0 | 0 | 0 | 24 |
| 1 | 0 | 0 | 0 | 0 | 1 | 1 | 0 | 25 |
| 1 | 0 | 0 | 0 | 0 | 1 | 0 | 0 | 26 |
| 1 | 0 | 0 | 0 | 0 | 1 | 0 | 0 | 27 |
| 1 | 0 | 0 | 0 | 0 | 1 | 1 | 0 | 28 |
| 1 | 0 | 0 | 0 | 1 | 0 | 1 | 0 | 29 |
| 0 | 1 | 1 | 1 | 1 | 1 | 0 | 0 | 30 |
| 0 | 1 | 1 | 0 | 1 | 1 | 0 | 0 | 31 |
| 0 | 1 | 0 | 1 | 1 | 1 | 0 | 0 | 32 |
| 0 | 1 | 0 | 0 | 1 | 1 | 0 | 0 | 33 |
| 0 | 0 | 1 | 1 | 1 | 0 | 1 | 1 | 34 |
| 0 | 0 | 1 | 0 | 1 | 0 | 1 | 0 | 35 |
| 0 | 0 | 1 | 0 | 1 | 0 | 0 | 0 | 36 |
| 0 | 0 | 1 | 0 | 0 | 1 | 1 | 0 | 37 |
| 0 | 0 | 1 | 0 | 0 | 1 | 0 | 0 | 38 |
| 0 | 0 | 1 | 0 | 0 | 0 | 1 | 0 | 39 |

In this embodiment, the address counter 12 includes 7 bits $C_1$ through $C_7$. The address counter 12 counts up in response to a signal SP, whereby the ROM 11 is progressively advanced by the addresss counter 12 through the decoder 13. An output signal of the first bit $C_1$ is applied to a pulse generator $Q_1$ and to another pulse generator $Q_3$ via an inverter I. Output signals of the remaining bits $C_2$ - $C_7$ are applied to the decoder 13. With such an arrangement, the system can perform the stitch forming operation up to 64 steps.

The address counter 12 is automatically cleared upon closing of a power supply switch 123 through an auto-clear circuit 124, which develops one shot pulse. And the address counter 12 counts up in response to the signal SP derived from an OR gate $G_{42}$ as tabulated below.

TABLE IV (CONTENTS OF THE ADDRESS COUNTER 12)

| $C_7$ | $C_6$ | $C_5$ | $C_4$ | $C_3$ | $C_2$ | $C_1$ |
|---|---|---|---|---|---|---|
| 0 | 0 | 0 | 0 | 0 | 0 | 0 |
| 0 | 0 | 0 | 0 | 0 | 0 | 1 |
| 0 | 0 | 0 | 0 | 0 | 1 | 0 |
| 0 | 0 | 0 | 0 | 0 | 1 | 1 |
| 0 | 0 | 0 | 0 | 1 | 0 | 0 |
| | | | | | | |
| | | | | | | |
| | | | | | | |

TABLE IV-continued

| \multicolumn{7}{c}{(CONTENTS OF THE ADDRESS COUNTER 12)} |
| $C_7$ | $C_6$ | $C_5$ | $C_4$ | $C_3$ | $C_2$ | $C_1$ |
|---|---|---|---|---|---|---|
| ⋮ | ⋮ | ⋮ | ⋮ | ⋮ | ⋮ | ⋮ |
| 1 | 1 | 1 | 1 | 1 | 1 | 0 |
| 1 | 1 | 1 | 1 | 1 | 1 | 1 |

The pulse generator $Q_1$ develops the one shot pulse upon every set of the first bit $C_1$ of the address counter 12. The pulse generator $Q_3$ develops the one shot pulse upon every reset of the first bit $C_1$ of the address counter 12.

The OR gate $G_{42}$ receives a signal $\beta$ derived from a pulse generator $Q_2$ which develops the signal $\beta$ in response to the synchronization pulse signal $\alpha$, and an output signal of an AND gate $G_{41}$ which receives the output signal of the pulse generator $Q_1$ at its one input terminal.

The digital information stored in the ROM 11 is introduced into buffer registers $B_X$ and $B_Y$ through gate circuits $G_X$ and $G_Y$, respectively. The gate circuits $G_X$ and $G_Y$ are controlled by the output signal of the pulse generator $Q_3$. That is, the digital information is introduced from the ROM 11 into the buffer registers $B_X$ and $B_Y$ when the first bit $C_1$ of the address counter 12 is changed from "1" to "0".

The buffer registers $B_X$ and $B_Y$ include 4 bits. The buffer register $B_X$ is connected to the resistor group $R_{11}$ via a signal line $L_X$, and the buffer register $B_Y$ is connected to the resistor group $R_{12}$ via a signal line $L_Y$. Although, in FIG. 17, the signal lines $L_X$ and $L_Y$ are represented by a single line, they include 4 lines for connecting the respective bits of the buffer registers to the corresponding resistors included within the resistor groups $R_{11}$ and $R_{12}$ in a parallel fashion.

The system further includes the modification means for widening the stitch width.

A switching means 125 functions to determine whether the stitch widening operation is to be performed or not, and to determine the degree of the widening operation. The switching means 125 includes a movable contact $125_A$ and stationary contacts $O_1$, $O_2$, $O_3$ and $O_4$. The stationary contact $O_1$ is connected to the other input terminal of the AND gate $G_{41}$ and determines that the stitch widening operation is not desired to be performed. The stationary contact $O_2$ is connected to an AND gate $G_{43}$, the stationary contact $O_3$ is connected to another AND gate $G_{44}$, and the stationary contact $O_4$ is connected to still another AND gate $G_{45}$.

The AND gates $G_{43}$ through $G_{45}$ also receive the output signal of the pulse generator $Q_1$. Moreover, the AND gate $G_{43}$ receives a code signal "0001", the AND gate $G_{44}$ receives another code signal "0010", and the AND gate $G_{45}$ receives still another code signal "0011". Output signals of the AND gates $G_{43}$ through $G_{45}$ are applied to an adder 126 via an OR gate $G_{46}$.

The adder 126 functions to add any one of the code signals derived from the AND gates $G_{43}$ through $G_{45}$ to the contents of the buffer register $B_X$, and then apply the output signal thereof to the buffer register $B_X$.

When the movable contact $125_A$ is connected to the stationary contact $O_2$, the AND gate $G_{43}$ develops the code signal "0001" in response to the pulse signal derived from the pulse generator $Q_1$, which is developed when the first bit $C_1$ of the address counter 12 is changed from "0" to "1". Therefore, the adder 126 receives the code signal "0001" through the OR gate $G_{46}$. In this way, the contents of the buffer register $B_X$ is increased by one.

The operation of the above-mentioned system is as follows:

When the power switch 123 is closed, the address counter 12 is automatically cleared, and the first address of the ROM 11 is selected because the contents of the bits $C_2$ through $C_7$ of the address counter 12 are "000000". The pulse generator $Q_3$ develops the pulse because the bit $C_1$ is "0", whereby the gate circuits $G_X$ and $G_Y$ are conducted to introduce the digital information stored at the first address of the ROM 11 into the buffer registers $B_X$ and $B_Y$. The output signals of the buffer registers $B_X$ and $B_Y$ are applied to the registor groups $R_{11}$ and $R_{12}$ through the signal lines $L_X$ and $L_Y$.

Under these conditions, when the manual switch $SW_K$ is closed, the needle 6 is driven in order to form a stitch at a desired position corresponding to the digital information stored at the first address of the ROM 11.

When the first stitch forming operation is completed, the synchronization pulse signal $\alpha$ is developed and, hence, the signal $\beta$ is developed from the pulse generator $Q_2$. The signal $\beta$ creates the signal SP through the OR gate $G_{42}$, whereby the address counter 12 counts up in response to the stitch forming completion.

Now assume that the movable contact $125_A$ is connected to the stationary contact $O_1$. In this case, the AND Gate $G_{41}$ develops the output signal to develop the signal SP via the OR gate $G_{42}$ to advance the address counter 12 by one when the bit $C_1$ is "1". In this way, the following addresses of the ROM 11 is progressively selected to form the stitch pattern as shown in FIG. 14.

Now assume that the movable contact $125_A$ is connected to the stationary contact $O_2$.

The first stitch is formed in a same manner as discussed above. When the first stitch forming operation is completed, the signal SP is developed in response to the synchronization pulse signal $\alpha$. With this signal SP, the contents of the address counter 12 ($C_1$ through $C_7$) become "1000000". Therefore, the pulse generator $Q_1$ is activated to apply the pulse to the AND gate $G_{43}$. Under these conditions, the code signal "0001" is applied to the adder 126 through the AND gate $G_{43}$ and the OR gate $G_{46}$. The adder 126 functions to add the digital value "0001" to the contents of the buffer register $B_X$, or, "0010", whereby the resultant information "0011" is stored at the buffer register $B_X$.

The following needle penetration is conducted after thus modified digital information of the buffer register $B_X$ and the present digital information of the buffer register $B_Y$ is applied to the stitch forming unit 1 and, therefore, the second stitch is formed at the position shifted by one along the X axis with respect to the first stitch.

When the second stitch forming operation is completed, the SP signal is again developed in response to the synchronization pulse signal $\alpha$. With this signal SP, the contents of the address counter 12 ($C_1$ through $C_7$) become "0100000", whereby the second address of the ROM 11 is selected. Since the bit $C_1$ of the address counter 12 becomes "0", the pulse generator $Q_3$ develops the output signal to conduct the gate circuits $G_X$ and $G_Y$, whereby the digital information stored at the second address of the ROM 11, or, the digital information "0010", "0011" is introduced into the buffer registers $B_X$ and $B_Y$, respectively. In this way, the stitch pattern shown in FIG. 15 is formed.

When the movable contact $125_4$ is connected to the stationary contact $O_3$, the code signal "0010" is applied to the adder 126 in response to the pulse generated from the pulse generator $Q_1$. Therefore, the stitch pattern shown in FIG. 16 is formed.

In the foregoing embodiments, the work position is controlled by the absolute position information. Alternatively, the work feed can be controlled by the relative value, or, the displacement from the preceding stitch position. In this case, the maximum backward feed is represented by "0000", and the maximum forward feed is represented by "1111". And "1000" represents that the work is not required to be fed.

More particularly, the work feed controlling signal is tabulated as follows:

TABLE V

| (WORK FEED SIGNAL IN THE RELATIVE DRIVE MODE) | |
|---|---|
| 0000 | feed backward by 8 pitches |
| 0001 | feed backward by 7 pitches |
| 0010 | feed backward by 6 pitches |
| 0011 | feed backward by 5 pitches |
| 0100 | feed backward by 4 pitches |
| 0101 | feed backward by 3 pitches |
| 0110 | feed backward by 2 pitches |
| 0111 | feed backward by 1 pitch |
| 1000 | no work feed |
| 1001 | feed forward by 1 pitch |
| 1010 | feed forward by 2 pitches |
| 1011 | feed forward by 3 pitches |
| 1100 | feed forward by 4 pitches |
| 1101 | feed forward by 5 pitches |
| 1110 | feed forward by 6 pitches |
| 1111 | feed forward by 7 pitches |

In this case the digital information stored in the ROM 11 is as follows to form the stitch pattern shown in FIG. 14.

TABLE VI (ROM CONTENTS IN THE RELATIVE WORK FEED MODE)

| $R_y$ | | | | $R_x$ | | | | |
|---|---|---|---|---|---|---|---|---|
| 1 | 0 | 1 | 0 | 0 | 0 | 1 | 0 | 1 |
| 1 | 0 | 0 | 1 | 0 | 0 | 1 | 0 | 2 |
| 1 | 0 | 0 | 1 | 0 | 0 | 1 | 0 | 3 |
| 1 | 0 | 0 | 1 | 0 | 0 | 1 | 0 | 4 |
| 1 | 0 | 0 | 1 | 0 | 0 | 1 | 0 | 5 |
| 1 | 0 | 0 | 1 | 0 | 0 | 1 | 0 | 6 |
| 1 | 0 | 0 | 1 | 0 | 0 | 1 | 0 | 7 |
| 1 | 0 | 0 | 1 | 0 | 0 | 1 | 0 | 8 |
| 1 | 0 | 0 | 1 | 0 | 0 | 1 | 0 | 9 |
| 1 | 0 | 0 | 1 | 0 | 0 | 1 | 0 | 10 |
| 1 | 0 | 0 | 1 | 0 | 0 | 1 | 0 | 11 |
| 1 | 0 | 0 | 1 | 0 | 0 | 1 | 0 | 12 |
| 1 | 0 | 0 | 1 | 0 | 0 | 1 | 0 | 13 |
| 1 | 0 | 0 | 0 | 0 | 1 | 0 | 0 | 14 |
| 1 | 0 | 0 | 0 | 0 | 1 | 1 | 0 | 15 |
| 1 | 0 | 0 | 0 | 1 | 0 | 0 | 0 | 16 |
| 1 | 0 | 0 | 0 | 1 | 0 | 1 | 0 | 17 |
| 0 | 1 | 1 | 1 | 1 | 0 | 1 | 1 | 18 |
| 0 | 1 | 1 | 1 | 1 | 1 | 0 | 0 | 19 |
| 0 | 1 | 1 | 1 | 1 | 1 | 0 | 0 | 20 |
| 0 | 1 | 1 | 1 | 1 | 1 | 0 | 0 | 21 |
| 0 | 1 | 1 | 1 | 1 | 1 | 0 | 0 | 22 |
| 0 | 1 | 1 | 1 | 1 | 0 | 1 | 0 | 23 |
| 1 | 0 | 0 | 0 | 1 | 0 | 0 | 0 | 24 |
| 1 | 0 | 0 | 0 | 0 | 1 | 1 | 0 | 25 |
| 1 | 0 | 0 | 0 | 0 | 1 | 0 | 0 | 26 |
| 1 | 0 | 0 | 0 | 0 | 1 | 0 | 0 | 27 |
| 1 | 0 | 0 | 0 | 1 | 1 | 0 | 0 | 28 |
| 1 | 0 | 0 | 0 | 1 | 0 | 1 | 0 | 29 |
| 0 | 1 | 1 | 1 | 1 | 0 | 0 | 0 | 30 |
| 0 | 1 | 1 | 1 | 1 | 0 | 0 | 0 | 31 |
| 0 | 1 | 1 | 1 | 1 | 0 | 0 | 0 | 32 |
| 0 | 1 | 1 | 1 | 1 | 0 | 0 | 0 | 33 |
| 0 | 1 | 1 | 1 | 0 | 1 | 1 | 0 | 34 |
| 0 | 1 | 1 | 1 | 0 | 1 | 0 | 0 | 35 |
| 1 | 0 | 0 | 1 | 0 | 0 | 0 | 0 | 36 |
| 1 | 0 | 0 | 0 | 0 | 1 | 1 | 0 | 37 |
| 1 | 0 | 0 | 0 | 0 | 1 | 0 | 0 | 38 |
| 1 | 0 | 0 | 0 | 0 | 1 | 0 | 0 | 39 |

Although in the foregoing embodiments the ROM stores the digital information related to the positional coordinates of the respective stitches, the ROM can store commands to directly drive the needle position control unit and the work feed mechanism. Moreover, in the foregoing embodiments the ROM is employed as the static memory, however, a card reader mechanism can be employed to control the system in accordance with the information recorded on a card.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an electric sewing machine which forms a stitch pattern in response to an output signal from a control system, the control system comprising:
   a static memory for storing digital information related to positional coordinates for each stitch of a predetermined stitch pattern;
   an address counter for progressively advancing steps of the static memory for read out purposes;
   a dynamic memory for temporarily storing the digital information derived from the static memory;
   a synchronization pulse signal generator for developing a synchronization pulse signal in response to stitch forming operation conducted by the sewing machine;
   means for progressively reading out the digital information temporarily stored in the dynamic memory in response to the synchronization pulse signal;
   modification means for modifying the digital information temporarily stored in the dynamic memory; and
   supply means for supplying the digital information read out from the dynamic memory to a stitch forming section of the sewing machine.

2. The control system of claim 1, wherein the static memory is made of a read only memory including a plurality of stitch pattern information, and wherein a selection means is further provided for selecting a desired stitch information stored in the read only memory.

3. The control system of claim 1, wherein the dynamic memory is made of a shift register for temporarily storing the digital information related to a stitch pattern stored in the static memory.

4. The control system of claim 3, wherein the digital information stored in the static memory is introduced into the shift register at a timing different from the timing at which the digital information temporarily stored in the shift register is read out.

5. The control system of claim 1, which further comprises means for allowing the modification operation while the digital information temporarily stored in the dynamic memory is not read out.

6. In an electronic sewing machine which forms a stitch pattern in response to an output signal from a control system, the control system comprising:
   a static memory for storing digital information related to positional coordinates for each stitch of a predetermined stitch pattern, the first step of the static memory storing the absolute position information of the first stitch of the stitch pattern and following steps of the static memory storing the relative position information related to succeeding stitches corresponding to displacements from a preceding stitch position;

a synchronization pulse signal generator for developing a synchronization pulse signal in response to stitch forming operation conducted by the sewing machine;

an address counter for progressively advancing the steps of the static memory for read out purposes in response to the synchronization pulse signal;

a buffer memory for temporarily storing digital information;

an adder for adding the digital information derived from the static memory to the digital information temporarily stored in the buffer memory;

feed back means for feeding back an output signal of the adder to the buffer memory; and supply means for supplying the digital information temporarily stored in the buffer memory to a stitch forming section of the sewing machine.

7. The control system of claim 6, which further comprises modification means for modifying the digital information temporarily stored in the buffer memory.

8. The control system of claim 7, wherein an output signal of the modification means is applied to the adder in order to modify the digital information temporarily stored in the buffer memory.

9. The control system of claim 2, which further comprises means for allowing the modification operation while the digital information temporarily stored in the dynamic memory is not read out.

10. The control system of claim 3, which further comprises means for allowing the modification operation while the digital information temporarily stored in the dynamic memory is not read out.

11. The control system of claim 4, which further comprises means for allowing the modification operation while the digital information temporarily stored in the dynamic memory is not read out.

12. In an electronic sewing machine which forms a stitch pattern in response to an output signal from a control system, the control system comprising:

a static memory for storing digital information related to positional coordinates of a needle and a work for each stitch of a predetermined stitch pattern;

an address counter for progressively advancing steps of the static memory for read out purposes;

a dynamic memory for temporarily storing the digital information related to said positional coordinates of the needle and the work derived from the static memory;

a synchronization pulse signal generator for developing a synchronization pulse signal in response to stitch forming operation conducted by the sewing machine;

means for progressively reading out the digital information related to said positional coordinates of the needle and the work stored in the dynamic memory in response to the synchronization pulse signal; and supply means for supplying the digital information related to said positional coordinates of the needle and the work read out from the dynamic memory to a needle position control means and a work feed control means, respectively, included within a stitch forming section of the sewing machine.

13. The control system of claim 12, wherein the static memory is made of a read only memory including a plurality of stitch pattern information, and wherein a selection means is further provided for selecting a desired stitch information stored in the read only memory.

14. The control system of claim 12, wherein the dynamic memory is made of a shift register for temporarily storing the digital information related to a stitch pattern stored in the static memory.

15. The control system of claim 14, wherein the digital information stored in the static memory is introduced into the shift register at a timing different from the timing at which the digital information temporarily stored in the shift register is read out.

16. The control system of claim 12, which further comprises the modification means for modifying the digital information temporarily stored in the dynamic memory.

17. The control system of claim 16, which further comprises means for allowing the modification operation while the digital information temporarily stored in the dynamic memory is not read out.

18. In an electronic sewing machine which forms a stitch pattern in response to an output signal from a control system, the control system comprising:

a static memory for storing digital information related to positional coordinates of a needle and a work for each stitch of a predetermined stitch pattern;

an address counter for advancing steps of the static memory for read out purposes;

a dynamic memory for temporarily storing the digital information related to said positional coordinates of the needle and the work derived from the static memory;

means for reading out the digital information related to said positional coordinates of the needle and the work stored in the dynamic memory in response to stitch formation; and supply means for supplying the digital information related to said positional coordinates of the needle and the work read out from the dynamic memory to a needle position control means and a work feed control means, respectively, included within a stitch forming section of the sewing machine.

19. The control system of claim 18, wherein the static memory is made of a read only memory including a plurality of stitch pattern information, and wherein a selection means is further provided for selecting a desired stitch information stored in the read only memory.

20. The control system of claim 18, wherein the dynamic memory is made of a shift register for temporarily storing the digital information related to a stitch pattern stored in the static memory.

21. The control system of claim 20, wherein the digital information stored in the static memory is introduced into the shift register at a timing different from the timing at which the digital information temporarily stored in the shift register is read out.

22. The control system of claim 18, which further comprises modification means for modifying the digital information temporarily stored in the dynamic memory.

23. The control system of claim 22, which further comprises means for allowing the modification operation while the digital information temporarily stored in the dynamic memory is not read out.

* * * * *